United States Patent
Paila et al.

(10) Patent No.: US 12,299,019 B2
(45) Date of Patent: May 13, 2025

(54) SYSTEMS AND METHODS FOR MULTI-LANGUAGE TEXT INDEXING AND SEARCH

(71) Applicant: Honeywell International Inc., Charlotte, NC (US)

(72) Inventors: Lakshminarayana Paila, Knoxville, TN (US); Ankit Singh, Apex, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/166,277

(22) Filed: Feb. 8, 2023

(65) Prior Publication Data
US 2024/0265042 A1 Aug. 8, 2024

(51) Int. Cl.
G06F 16/33 (2019.01)
G06F 16/31 (2019.01)
G06F 16/334 (2025.01)
G06F 40/123 (2020.01)
G06F 40/263 (2020.01)

(52) U.S. Cl.
CPC .......... *G06F 16/3344* (2019.01); *G06F 16/31* (2019.01); *G06F 40/123* (2020.01); *G06F 40/263* (2020.01)

(58) Field of Classification Search
None
See application file for complete search history.

(56) References Cited

U.S. PATENT DOCUMENTS

| | | | |
|---|---|---|---|
| 6,415,250 B1 * | 7/2002 | van den Akker | G06F 40/216 704/9 |
| 8,296,124 B1 * | 10/2012 | Holsztynska | G06F 40/51 704/7 |
| 8,386,477 B1 * | 2/2013 | Murphy | G06F 40/58 707/760 |
| 2004/0168132 A1 * | 8/2004 | Travieso | G06F 16/95 715/201 |
| 2009/0063470 A1 | 3/2009 | Peled et al. | |
| 2013/0103493 A1 * | 4/2013 | Gao | G06Q 30/0241 707/706 |

OTHER PUBLICATIONS

Daniel Otter; A Survey of the Usages of Deep Learning for Natural Language Processing; 2021; IEEE; p. 604-609 (Year: 2020).*
European search report Mailed on Jun. 21, 2024 for EP Application No. 24156152, 8 page(s).

* cited by examiner

*Primary Examiner* — Albert M Phillips, III
*Assistant Examiner* — Jermaine A Mincey
(74) *Attorney, Agent, or Firm* — ALSTON & BIRD LLP

(57) ABSTRACT

A method of optimizing full text search results for multiple languages includes importing a document from a first organization including one or more first organization users, wherein the one or more first organization users are associated with a first organization location; determining a first organization language based on the first organization location; analyzing the imported document with a natural language processing (NLP) service to determine a primary document language; and indexing a determined document language to the imported document based at least in part on the first organization language and the primary document language, wherein indexing the determined document language to the imported document causes the document to be searched using a document search tool in the determined document language.

19 Claims, 8 Drawing Sheets

SYSTEMS AND METHODS FOR MULTI-LANGUAGE TEXT INDEXING AND SEARCH

TECHNICAL FIELD

The present disclosure relates to full text search of documents, and more specifically, to full text search of documents indexed in various languages using a document management system and an open source, distributed search and analytics tool.

BACKGROUND

Currently, users importing documents to a document management system may manually select a document language for the imported documents. Such manual selection can be time consuming and prone to errors. For instance, a user may be importing a document that he or she did not draft without opening or editing the document and may make one or more assumptions about a language content of the document (e.g., that the document is in English, when it is in fact, not). Further, document management systems may have default languages for imported documents such that systems have an inherent bias toward these default languages resulting in an over proliferation of documents being indexed in the document management system's default language. Still more, some documents may have multiple languages and document management system settings or defaults may not properly index these documents based on the multiple languages of the document. This language misidentification may result in incomplete indexing and/or render the document unfindable to users of a search and analytics tool searching for relevant documents. Accordingly, systems and methods for multi-language text indexing and search may be required.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a method of optimizing full text search results for multiple languages comprises importing a document from a first organization including one or more first organization users, wherein the one or more first organization users are associated with a first organization location; determining a first organization language based on the first organization location; analyzing the imported document with a natural language processing (NLP) service to determine a primary document language; and indexing a determined document language to the imported document based at least in part on the first organization language and the primary document language, wherein indexing the determined document language to the imported document causes the document to be searched using a document search tool in the determined document language.

In another embodiment, a system for optimizing full text search results for multiple languages comprises a processing device, and a memory storing one or more processor-executable instructions. The instructions, when executed by the processing device, cause the system to: import a document from a first organization including one or more first organization users, wherein the one or more first organization users are associated with a first organization location; determine a first organization language based on the first organization location; analyze the imported document with a natural language processing (NLP) service to determine a primary document language; and index a determined document language to the imported document based at least in part on the first organization language and the primary document language, wherein indexing the determined document language to the imported document causes the document to be searched using a document search tool in the determined document language.

In yet another embodiment, a method of searching a document in an indexed primary document language including: importing a document from a first organization including one or more first organization users, wherein the one or more first organization users are associated with a first organization location; determining a first organization language based on the first organization location; analyzing the imported document with a natural language processing (NLP) service to determine a primary document language; indexing a determined document language to the imported document based at least in part on the first organization language and the primary document language, and searching the imported document using a document search tool configured to search the imported document in the indexed language.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which.

DETAILED DESCRIPTION

Systems and methods described herein relate to automatically indexing a document language to a document based on automatically assigned document metadata and other document criteria. For example, a document may be assigned a country of origin at its creation or when the document is edited based on a location of a user. The location of the user can be determined, for example, based on one or more user criteria associated with a user identity (e.g., an IP address of the user, one or more user ID credentials, etc.) Based on automatically assigning a location of origin, location of editing, or other location associated with the document, the document may be assigned a primary indexing language for later search and retrieval of the document within a document management system. For example, a document may be assigned the English language, the Spanish language, the Portuguese language, etc. for inclusion in the documents metadata and that metadata may be used to present the document more readily, and accurately, in search results. Accordingly, documents in a document management system may more accurately be searched, indexed, and used and their content may more readily be usefully accessible to users of the document management system. The following disclosure is related to further details and various aspects of indexing documents in a document management system.

For example, in one exemplary embodiment, a method of optimizing full text search results for multiple languages may include importing a document from a first organization including one or more first organization users, wherein the one or more first organization users are associated with a first organization location; determining a first organization language based on the first organization location; analyzing the imported document with a natural language processing (NLP) service to determine a primary document language; and indexing a determined document language to the imported document based at least in part on the first organization language and the primary document language. Indexing the determined document language to the imported document may cause the document to be searched using a document search tool in the determined document language.

Figure 1:
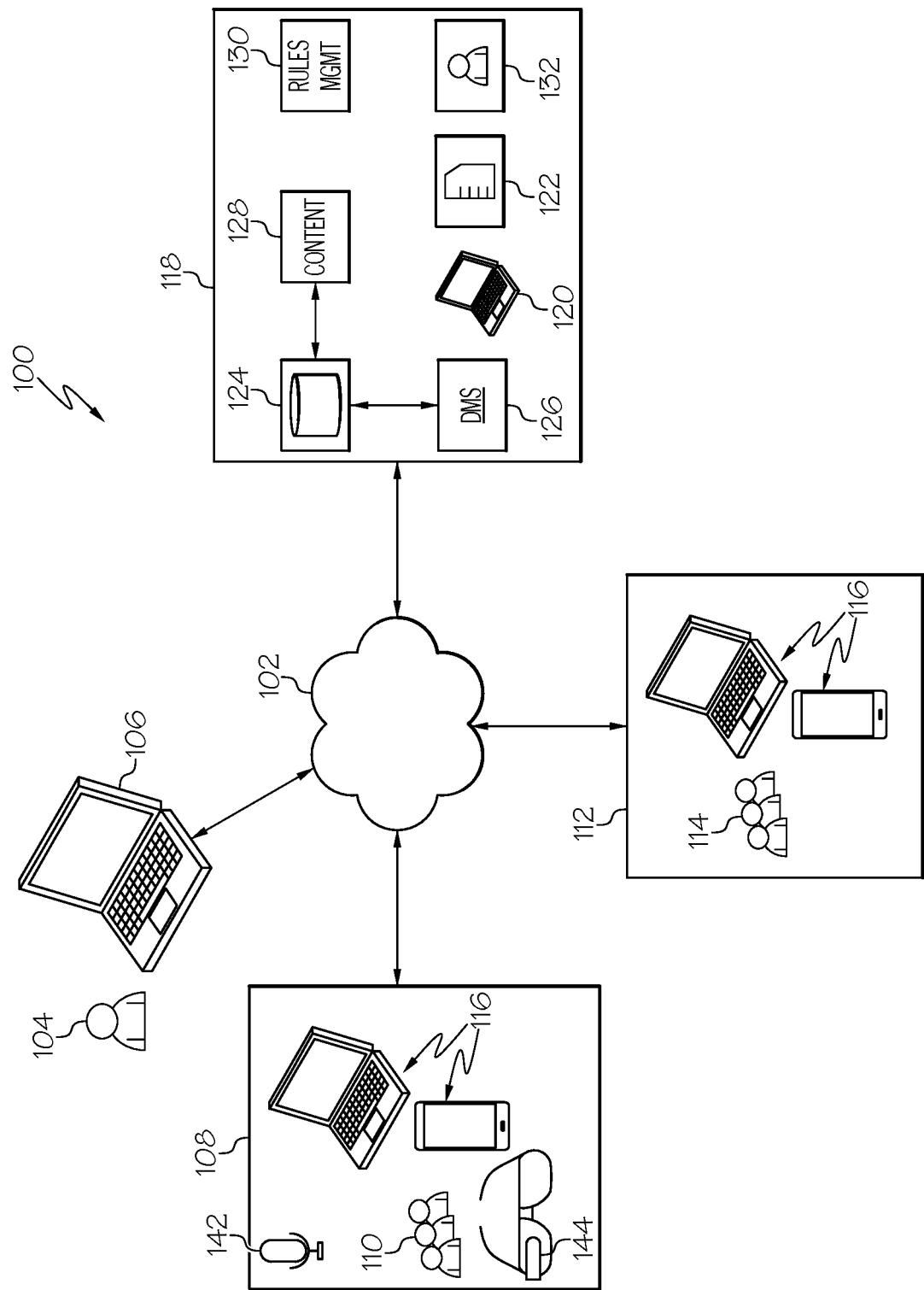
FIG. 1 illustrates an exemplary computing environment for implementing one or more of the systems and methods described herein.

Referring to FIG. 1, a system 100 for multi-language text indexing and search is shown. The system 100 may include a plurality of nodes comprising one or more processing devices (e.g., personal computers, computer networks, personal devices, device networks, etc.) communicatively coupled to a network 102. One or more users may be connected to the network 102. For example, an admin user 104 may connect to the network through an admin device 106. In embodiments, users may be grouped according to one or more similar characteristics. For example, the users may be grouped according to a department of the users, a geographical location of the users, a primary language of the users, etc. In some embodiments, a first grouping 108 may include one or more users 110 and a second grouping 112 may include one or more users 114. The users may connect to the network 102 via user devices 116. A file management system may include or be comprised on a document management server (DMS) 118, which DMS 118 may be communicatively coupled to the network 102. The DMS 118 may comprise one or more processing devices 120, one or more memory devices 122, one or more databases 124 (or repositories, content repositories, etc.), a document management system (DMS) module 126, a content module 128, a rules management module 130, and a user profile module 132. In some embodiments, one or more of the users 110 may provide inputs to the system 100 via one or more input devices. For example, the users 110 may provide input to the system 100 via an audible input 142 and/or a hands-free input 144. The audible input 142 may be communicatively coupled to, for example, software for understanding one or more speech inputs and the hands-free input 144 may be capable of receiving and providing to the system 100 one or more inputs based on visual and/or audible data (e.g., by scanning a QR code, etc.)

The network 102 may be used to transmit data from the various data processing devices to the server (e.g., a computer of any appropriate configuration) in an appropriate manner. For instance, the data processing device(s) and the server may communicate over a local area computer network (LAN) or a public computer network (e.g., the Internet). In some embodiments, the network 102 may be a private LAN and may be separated from the public Internet by, for example, a firewall. The information associated with a context-based search may be transmitted from the server to one or more of the nodes in any appropriate manner. For instance, the server and a node (e.g., a personal computer; a desktop computer; a laptop computer; a "dumb" terminal) at any location connected to the network may communicate over a computer network, such as a public computer network (e.g., the Internet). A web application may be used to view search results as well.

The one or more processors 120 may communicatively couple with the one or more memory devices to perform one or more of the computer-based methods described herein. The DMS 118 may enable users to manage one or more types of files such as, for example, text-based files, image-based files, charts, presentations, images, videos, sounds, and other types of files. The DMS 118 may present one or more interfaces including a query function, allowing users to search a connected database (e.g., an open source, distributed search and analytics tool) and may provide search results using a search engine that can conduct a search of the relevant databases communicatively coupled to a device of the user. In some embodiments, the relevant databases may be automatically selected for a given search based on a profile of the user (as determined, for example, with the user profile module 132). The automatically selected databases may be a default setting based on, for example, a profile of the user (e.g., to which department a user identity is assigned) and the selected databases may be configurable such that a user can decide which databases the user's queries search.

The content module 128 may include one or more caches or containers for storing corporate documents and other content. For example, the content module 128 may include a repository of documents with text in one or more languages, each document being indexed for the one or more languages it includes text in. In some embodiments, one or more of the stored documents or data may relate to an Annual Product Quality Review (APQR) report. In embodiments, a content type may define how the content is stored in the content module 128. For example, business logic and methods, database structure, definitions (e.g., schema, field, table, etc.) and associated content of different content types may be stored in different manners, accordingly. Business logic and the methods of the module may be configured to act based on particular content items having been stored in the database (e.g., in the case of a particular visualizations or visualization data being stored in one or more aspects of the content module 128). For example, content with text and/or other portions in a particular language (e.g., English, French, Portuguese, etc.) may be indexed for those particular languages as described in greater detail herein. The various documents may include one or more programs or aspects of programs including natural language processing and/or language-aware processing for documents and/or search expressions. The natural language processing and/or language-aware processing may require the text language to be properly identified and the document to be indexed with the properly identified language. For documents in the system, language misidentification may cause incomplete indexing, which may render any particular document not findable by some types of searches.

Figure 2:
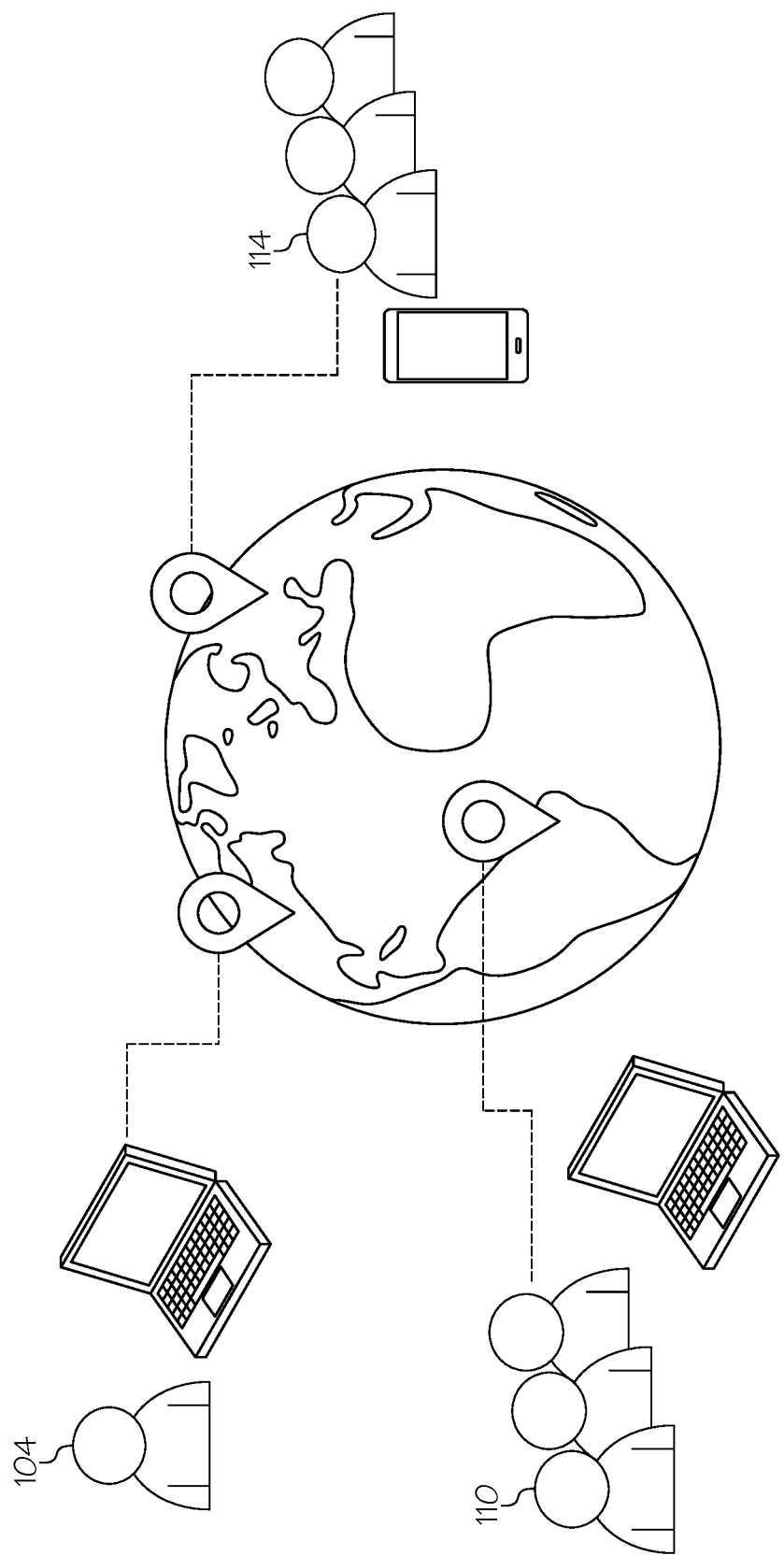
FIG. 2 further illustrates aspects of the exemplary environment of FIG. 1.

The rules management module 130 may administrate one or more Business rules for multi-language text indexing and search. In some embodiments, a text index or other index of symbols, which could be, for example, an inverted index, can be built for any particular locale and may be bespoke for the particular locale in which the index is generated. For example, with brief reference to FIG. 2, users 104 in an American locale, where documents may be typically generated in English, may have one or more text indexes or search tools in an English language, while users 110 in Brazil may have text indexes and search tools in, for example, a Portuguese language and users 114 in Europe may have index and search tools in multiple languages including, for example, French, Spanish, German, Portuguese, and other languages. In some embodiments, one or more indexes may be built to cover most or all of the words, characters (including special characters), common phrases, and other parts of speech or text for the various language locales and these parts of speech may be indexed to one or more bespoke or local indexes accordingly. Subsequently, a search query may be received for a given locale, in effect searching any file that contains a search term of the search query and the variance between local languages can be used to generate a search result of all terms or parts of speech with similar meanings.

In some embodiments, a language specific index can be static or dynamic for a given device or type of device. For example, still referring to FIG. 2, users 114 logging into the system using a mobile device may have a dynamic language indexing and search function based on a mobile device's capability to travel anywhere with a user, such that as a user who is traveling from one location to another where a language is more or less common can automatically shift to the local language for indexing and search functions on their device. For other devices or types of devices that may not be mobile, the search and indexing language functions may be less dynamic or static, based on, for example, a geographic location of an IP address with which the device connects to the Internet.

The user profile module 132 may collect or receive user profile information from the various users of the systems. In some embodiments, the user profile information includes information about the user such as the user's department, the user's role within the department or larger organization as a whole, a current or typical location of the user, various certifications or accreditations of a user, or other information. User profile information may include information related to languages used by a user, typical characters used by a user, languages of documents interacted with (e.g., selected, edited, etc.), documents drafted and information about the documents drafted (e.g., length, word choice, etc.), recent searches by the user, and other information. In some embodiments, the user may update information associated with his or her profile individually. For example, a user may input his or her location, preferred language, department information, etc., when creating his or her own user profile (e.g., by selecting a language from amongst various languages in a drop down) or may assign one or more filters temporarily to his or her profile. For example, if a user knows that they do not wish to receive documents or data in a given language (e.g., APQR documents in the Portuguese language, for example), the user could add such restriction to their profile and the restriction could affect the Business rules or other search or indexing logic when the user performs a search. User profile information may be collected and stored in a database, for example, the database(s) 124. Additionally, the user profile module 132 may assign a correlation between a particular search result in a set of search results as of particular interest to a given user profile with a correlation number, which correlation number may be used to update future language preferences, character preferences, etc.

The user profile module 132 may further include one or more aspects for managing user access permissions for example, the user profile module 132 may include one or more identity and access management (IAM) functions. The IAM functions could be enacted using, for example, a connection to one or more IAM databases (e.g., in the database(s) 124). The IAM function could be configured to communicate with other aspects of the system 100 using, for example, one or more connections via the network 102. The IAM function could use an IAM database to store, parse, categorize, or take other actions, for example, access rules, restriction requirements, management information, collected data, correlated data, predication data, behavioral information, and other suitable information, or any combination thereof. Further, the IAM function could dynamically restrict authorized users and access attempts if such users or access attempts occur when the IAM function may vulnerabilities or behaviors that are deemed hostile to the network 102. Accordingly, the IAM function and its use of tracking and monitoring behaviors over a long period of time could provide an added measure of security to any pre-defined policies followed by systems or subsystems communicatively coupled with the IAM function. In some embodiments, the IAM function may restrict access to particular data (e.g., data in a particular language, business analytics data, etc.) or documents or data based on, for example, a department of a user or other aspect of a user's profile. The IAM database may include information related to a user's profile such as, for example, a user's location and/or time zone, a user's address, a user's role within an organization, a user's IP address, a user's keyboard settings and/or keyboard profile.

Figure 3:
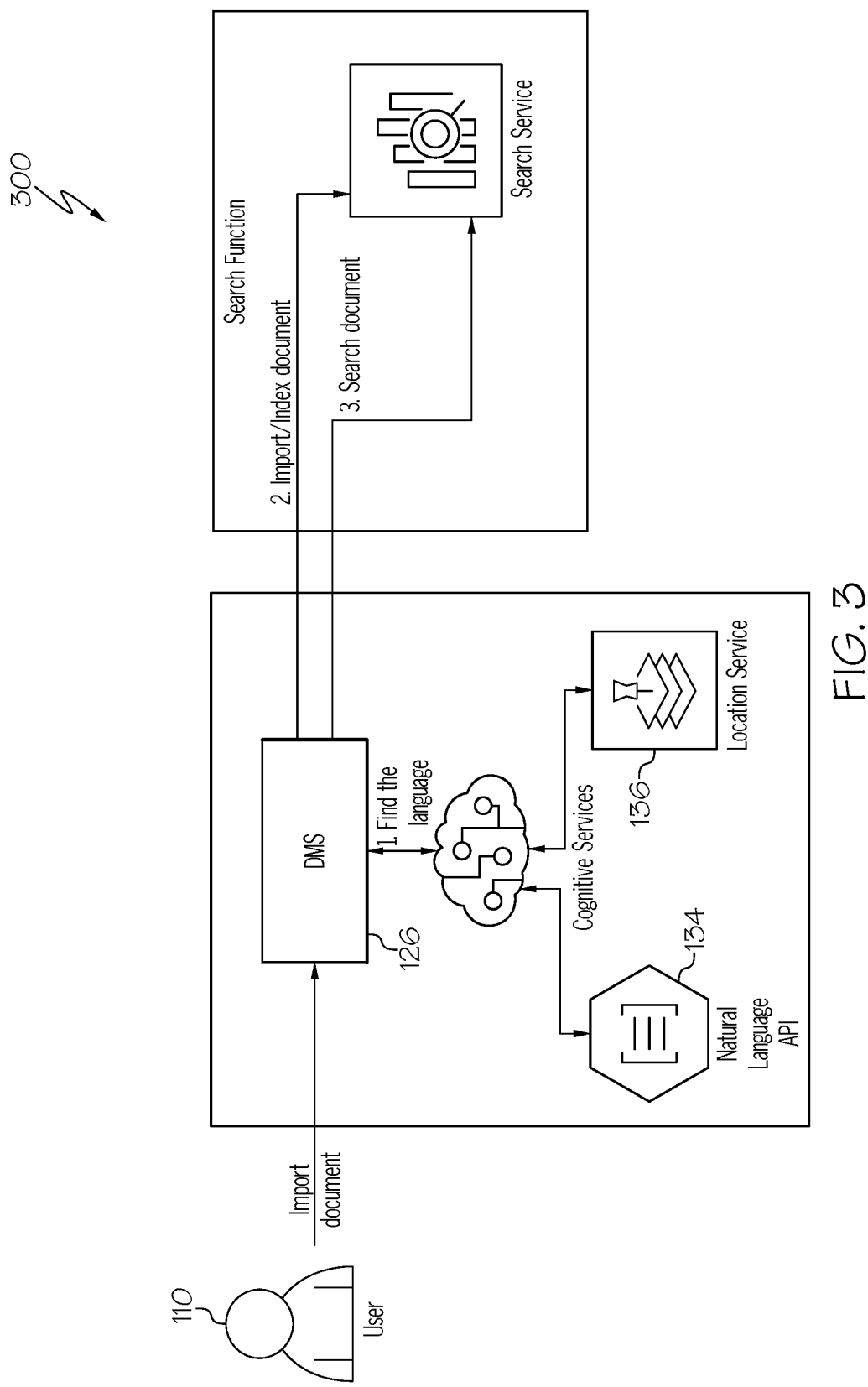
FIG. 3 illustrates a workflow for utilizing the computing environment of FIG. 1

Referring to FIG. 3, an exemplary environment 300 for full text search of documents indexed in various languages using a document management system and an open source, distributed search and analytics tool is shown. The environment includes the DMS 126, a natural language API 134, and a location services module 136.

The natural language API 134 may include or be configured to receive input from, for example, a natural language front end or user interface. The natural language API 134 may be configured to receive one or more natural language queries from one or more user devices and change the natural language queries into one or more structured operations, which structured operations (e.g., programming statements) are to be performed on documents in the DMS 126. The natural language API 134 may include, for example, an I/O interface, one or more rules databases for converting the one or more natural language queries received from a user into structured operations to be performed within the environment 300. The rules databases may contain rules for converting, for example, one or more natural language inquiries into structured query language (SQL) or other programming language. The rules in the database may be specific, for example, to various schema (e.g., application schema, data schema, etc.) and may be used to parse the natural language queries into structured queries as inputs to the system.

The location services module 136 may provide or generate data related to a physical location of a user device, for example, a processing device of the user (e.g., smart phone, laptop, etc.). In some embodiments, the location services module 136 may determine location by way of signals received from various systems associated with the processing device (e.g., GPS, a Wi-Fi positioning system, etc.). In some embodiments, the location services module 136 may determine a location of the device based on a geographic location associated with an IP address of the device, based on information in the user's profile (e.g., if the user has a particular location set as a primary location, etc.)

Based on information generated with the natural language API 134 and the location services module 136, the DMS 126 may import and/or index one or more documents and may search documents imported or indexed using the DMS 126.

Figure 4:
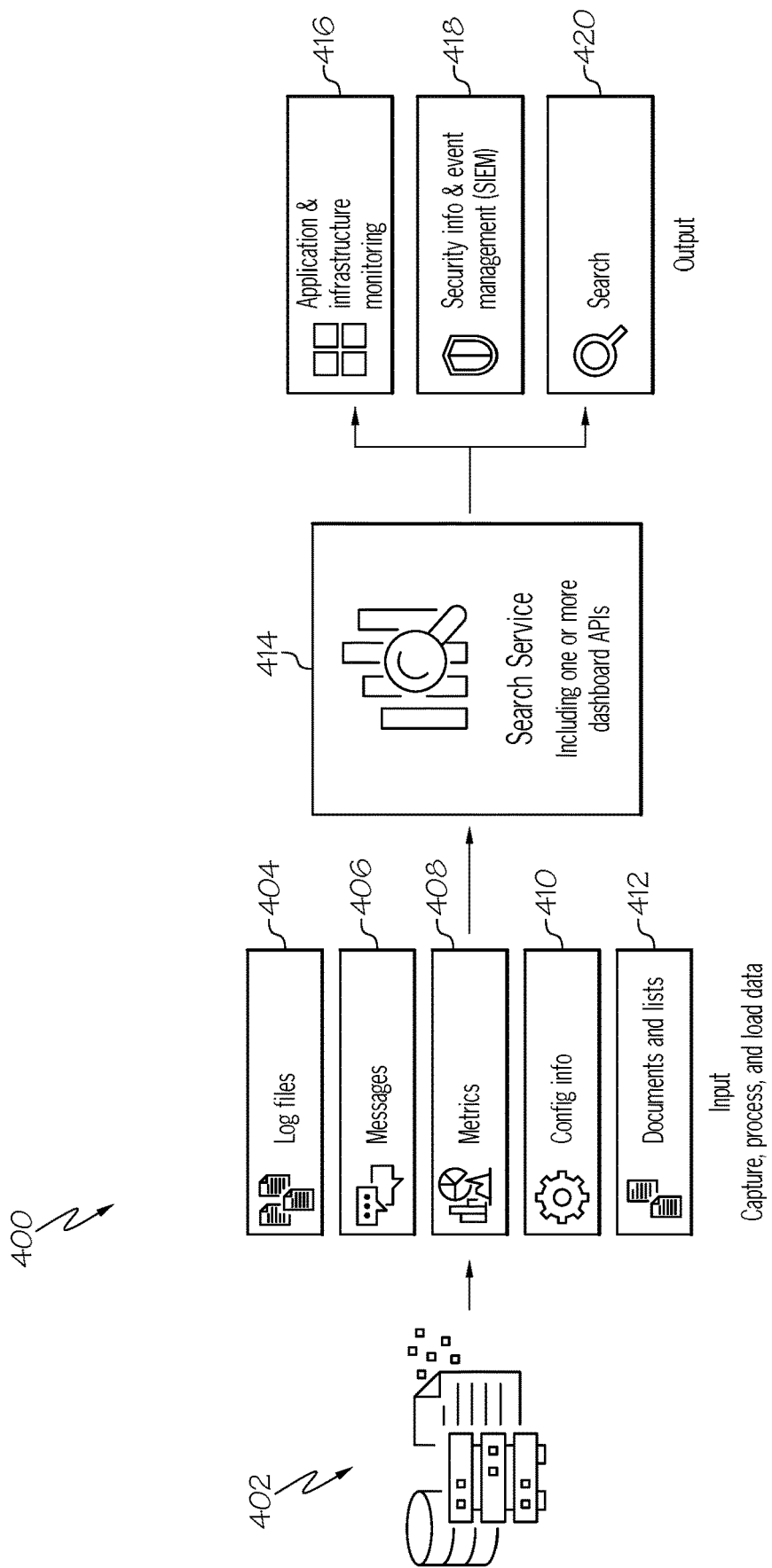
FIG. 4 illustrates additional aspects of a workflow for utilizing the computing environment of FIG. 1.

Referring now to FIG. 4, further details of a system 400 for searching and indexing documents and other data in multiple languages are shown. The system 400 may include one or more repositories 402 for storing and maintaining data in the system. The repositories 402 may contain various data types and documents including, for example, one or more log files 404, one or more messages 406, one or more metrics 408 (e.g., business intelligence metrics or other data stored in a BI tool), configuration information 410, and one or more other documents and lists 412. These documents and data can be input to the system 400 by its various users who may capture, process, and load data. The various documents and data can be searched using a search service 414 as described otherwise herein. The search service 414 may include one or more dashboard APIs such as the natural language API otherwise described herein as well as other dashboard APIs. The search services 414 can be used to output, for example, application and infrastructure monitoring 416 (for example, the generation and monitoring of one or more APQRs), security info & event management 418, and searching, including indexing, 420 of documents and data.

Figure 5:
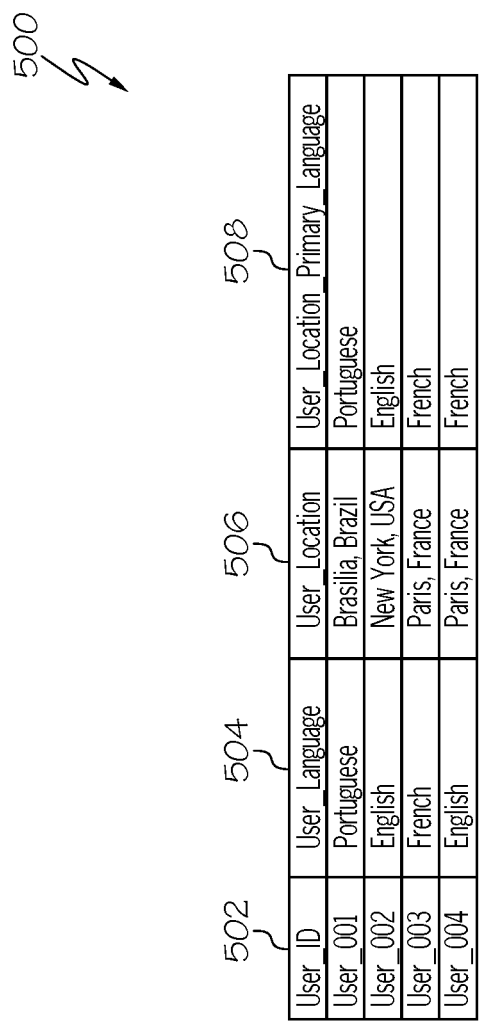
FIG. 5 illustrates a chart including metadata tags or imported documents imported using the computing environment of FIG. 1.

Referring to FIG. 5, the documents and data can be stored, for example, in a table such as the data table 500. The data can include information such as a user ID 502, a user language 504, a user location 506, and a user location primary language 508. In some embodiments, the user language may set by a user him or herself, for example, upon account creation or later during account settings amendment, and may define a user's primary language (i.e., the language that is normally indexed to documents and other data created by the user). Although only a small number of exemplary languages are shown, the language can be any language in the global lexicon, including subsets or dialects thereof. For example, a user language may be English (American), Spanish (Mexican), etc. The user location 506 can be detailed to any level of granularity to make it useful to distinguish between data when searching the indexed data. For example, if a user's location is not granular enough to accurately reflect a single primary language, the user's location may be further expounded upon (e.g., in additional data columns or otherwise). For example, if a user's location is northeast Spain, the user's primary language may be indistinguishable between Catalan and Spanish based on such location, and so the user's location may be further distinguished using additional data inputs. In some embodiments, an admin user may manually update and/or assign a location a primary language. For example, an admin user may assign a primary language of Portuguese to user locations in the country of Brazil. The admin may from time to time update the location primary languages based on, for example, a shift in the dominant language patterns of a region. In some embodiments, an admin user may be prompted automatically to change a user location primary language based on an amount of data produced by a given set of user's in a location (e.g., if a majority of user's in Spain use English to generate data or documents the primary language associated with user's in Spain may be updated to English or if a majority of data in a given location is produced in a new language for a given period of time the system may be designed to prompt an admin to change the default language to the newly-used language).

Figure 6:
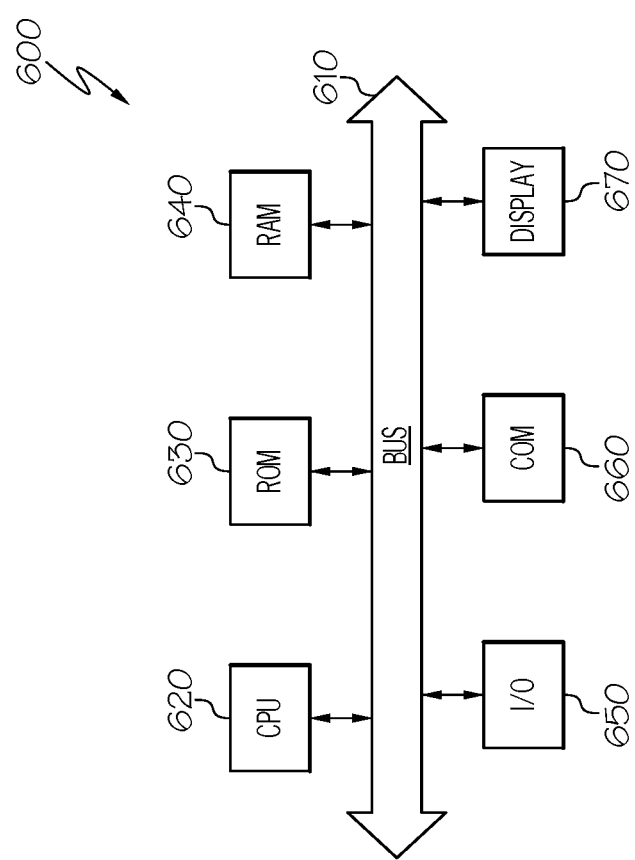
FIG. 6 illustrates an exemplary computing environment including a CPU and multiple storage devices.

FIG. 6 is a simplified functional block diagram of a computing system 600 that may be configured for carrying out one or more of the steps, programs, and/or executing techniques described herein, according to exemplary embodiments of the present disclosure. Specifically, in one embodiment, any of the modules of the system 100 may be an assembly of software and/or hardware including, for example, a data communication interface 660 for packet data communication. The platform may also include a central processing unit ("CPU") 620, in the form of one or more processors, for executing program instructions. The platform may include an internal communication bus 610, program storage, and data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. The system 600 may include one or more displays, such as display 670, for displaying information. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 6 and the following discussion provide a brief, general description of one example of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 7:
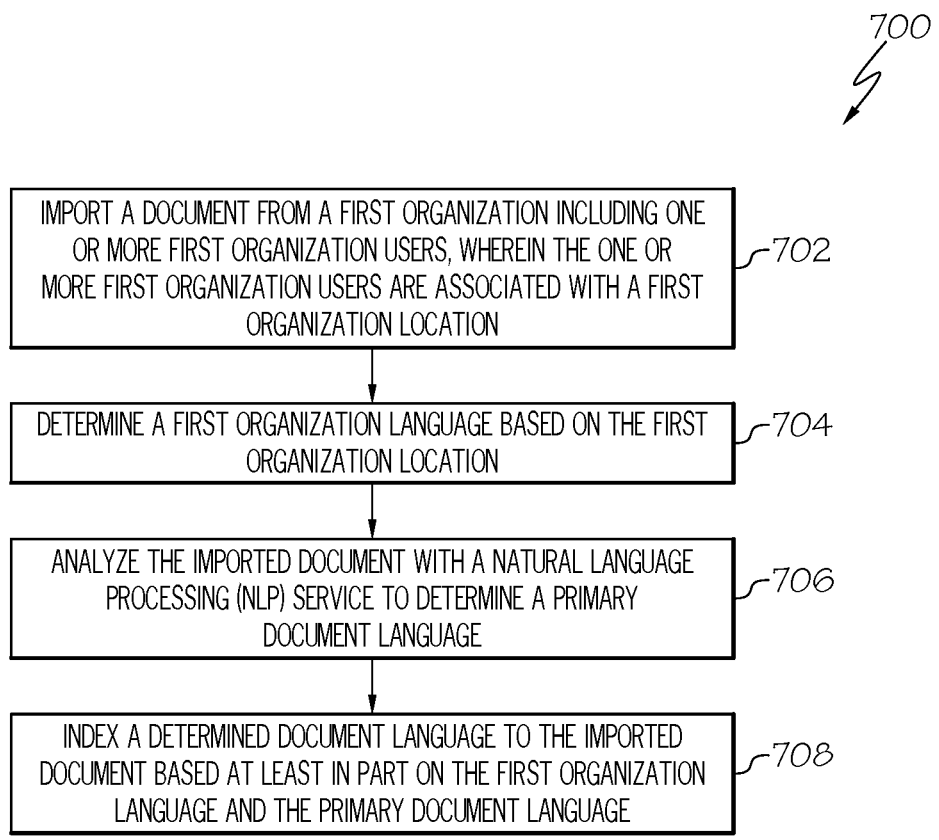
FIG. 7 illustrates a method for optimizing full text search results for multiple languages.

Referring to FIG. 7, a method 700 for multi-language text indexing and search is shown. The method 700 includes the various steps listed therein but it is to be understood that methods having fewer or more steps that that shown in FIG. 7 are contemplated herein.

At step 702, a user may import a document from a first organization. The first organization can include one or more first organization users and the one or more first organization users may be associated with a first organization location. For example, with brief reference to FIG. 2, the first organization may be a department whose operations generally occur in Paris, France, (i.e., in Europe) and the users may generally speak French. Accordingly, documents generated, uploaded, edited, etc. by the users may generally be in French and/or may contain other data in a different languages. For example, data may be generated in English or any other language. In one embodiment, the documents and other data generated, uploaded, edited, etc. may be portions of an Annual Product Quality Review (APQR) report (or simply, "APQR"). The APQR may be a document prepared within particular industries (e.g., the pharmaceutical industry) to review the quality and consistency of products generated by an organization (e.g., an organization associated with the users generated the data). APQRs may include data related to, for example, deviations, market complaints (e.g., quality events), and change controls associated with pharmaceutical products or services. The APQR may verify consistency of various manufacturing processes and may help determine process defects and other quality issues with products generated. Trends, business analytics, and other parameters may be tracked to determine possible quality and product efficiency improvements using the APQR. In some embodiments, the data may include information relating to raw materials or packing materials used for various products covered in the APQR.

In some embodiments, the document or data may be imported with data attached to the document or data (e.g., metadata) that describes a primary, secondary, or other language associated with the document or data. For example, with brief reference to FIG. 5, a user language may be associated with a user ID (e.g., in the user language column 504) and the user language may be used to assign a primary document or data language to the document or data based on cross reference to the uploading user's user id (e.g., in the user id column 502).

At step 704, a first organization language may be determined based on the first organization location. The first organization location can be determined based on an IP address of the user, a device location of the user, based on settings in the user profile, or based on some other method. For example, when a user logs in to the DMS 126 or an associated application, the user's location may be determined based on one or more of the criteria described herein. Based on the determined location using the various criteria, the system can use the location to affect searching and indexing of the data by the user as described herein. In some embodiments, the user may manually update his or her location. For example, the user may input his or her location as an input to their user profile when initially created and the data may be stored, for example, in a user location column of a database such as the column 506 of FIG. 5. In other embodiments, a user location may be determined automatically. In embodiments, the user location and/or location associated with documents may be assigned to the organization such that all documents or data generated by that organization have the given location associated with them. In some embodiments, the user's location may be associated with a primary language (e.g., as the user location primary language column 508). For example, a primary language associated with users in the United States of America may be English and a primary language associated with users in Brazil may be Portuguese. These are merely exemplary and the primary language could be set based on other properties or actions.

At step 706, the imported document may be analyzed with a natural language processing (NLP) service to determine a primary document language or a primary language for portions of data. For example, the natural language API 134 of FIG. 3 may be used to analyze the document to determine a primary document or data language. In some embodiments, the document may be uploaded by the user to the DMS 126 and the DMS 126 may provide the document or data to the natural language API 134 based on, for example, a user input or other logic stored in the DMS 126. In some embodiments, one or more of the DMS 126 and the natural language API 134 may be hosted as a cloud-based SaaS platform (e.g., in a virtual private cloud) and users may upload documents to the cloud-based SaaS platform after logging in to the platform using their user ID and login credentials. The DMS 126 may provide the document or data to a search service, which search service may also be hosted as a cloud-based SaaS platform.

At step 708, a determined document language may be indexed to the imported document or data based, at least in part, on the first organization language and the primary document language. Indexing the determined document language to the imported document may cause the document to be searched using a document search tool in the determined document language. The document search tool may be the cloud-based SaaS platform, for example. The determined document language can be assigned to one or more portions of the document, as determined, for example, based on the document analysis using the natural language API 134. The first organization language may be determined as described herein based on the location of the users of the document and/or data. In some embodiments, one or the other of the first organization language and the primary document language serves as the default basis for the document or data language and the default language can be changed based on a significant weight given to one or the other of the first organization language and the primary document language. For example, if a document is produced in English by a user in a group with a primary language of French, the document may default to either French or English depending on the Business rules programmed into the cognitive services associated with the DMS 126, the natural language API 134, and the location services 136.

In some embodiments, the system may carry out additional steps to index and search documents for multiple languages. For example, the system may determine that multiple document languages are used within a single document and may score each of the multiple document languages based on one or more scoring factors to distinguish the primary document language. Scoring factors can include information such as a score for an IP address and a user location and other information about a user. The scoring factors may be prioritized, for example, scoring factors could prioritize a user's location and/or IP address over other factors such as the user's department. The configuration of scoring factors may be on an individual profile basis in some embodiments. Once the various portions of the document in different languages have been scored, the system may assign a primary document language as distinguished from at least a secondary document language to the document based on the score. In some embodiments, the document may be assigned a primary document language that is different than the first organization language if a highest scoring document language is different than the first organization language and the highest scoring document language is above a language threshold score. The language threshold score may be that score necessary to promote a language to primary document language that is different than the primary language of an organization producing the data or document. For example, if a group of native Spanish speakers produce a document that is primarily (or only) in English, the document may score so high in the English language (e.g., as determined by the natural language processing API 134) that Spanish is not the primary document language, but English is.

In some embodiments, a first organization language may be determined based on one or more organizational associations of a user that imports the document. For example, if a user profile for the document importing user indicates that the user is associated with a French-speaking portion of an organization, the first organization language may be determined based on the associations of the user with the French-speaking portions of the organization. This may help documents default to the correct language setting when uploading for indexing and search and/or when searching documents. In some embodiments, a document owner or other user (e.g., an admin user) may be capable of changing document language settings (e.g., default settings) of a document based on their user input.

Figure 8:
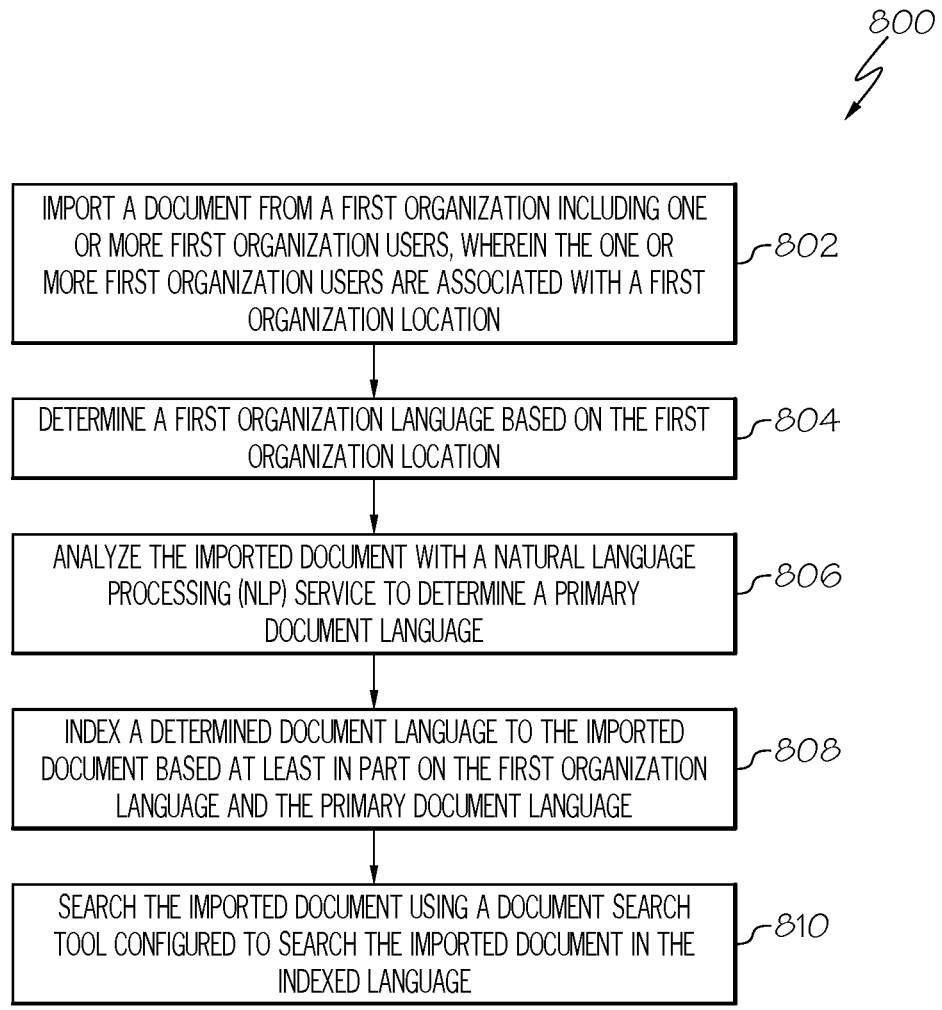
FIG. 8 illustrates a second method for optimizing full text search results for multiple languages.

Referring to FIG. 8, another method 800 for multi-language text indexing and search is shown. The method 800 includes the various steps listed therein but it is to be understood that methods having fewer or more steps that that shown in FIG. 8 are contemplated herein.

At step 802, a document may be imported from a first organization, which first organization may include one or more first organization users. The one or more first organization users may be associated with a first organization location. For example, with brief reference to FIG. 2, the first organization may be a department whose operations generally occur in Brasilia, Brazil, (i.e., in the Southern Hemisphere) and the users may generally speak Portuguese. Accordingly, documents generated, uploaded, edited, etc. by the users may generally be in Portuguese and/or may contain other data in a different languages. For example, data may be generated in English or any other language. In one embodiment, the documents and other data generated, uploaded, edited, etc. may be portions of an APQR report, which APQR report, as described otherwise herein may be a document prepared within especially the pharmaceutical industry to review the quality and consistency of products generated by an organization (e.g., an organization associated with the users generated the data). APQRs may have different reporting requirements in different jurisdictions, and hence, especially in global organizations, various data may need to be translated and interpreted between different languages. Such data could include, for example, data related to deviations, market complaints (e.g., quality events), and change controls associated with pharmaceutical products or services. The APQR may verify consistency of various manufacturing processes and may help determine process defects and other quality issues with products generated. Trends, business analytics, and other parameters may be tracked to determine possible quality and product efficiency improvements using the APQR. In some embodiments, the data may include information relating to raw materials or packing materials used for various products covered in the APQR.

At step 804, a first organization language may be determined based on the first organization location. The first organization location can be determined based on an IP address of the user, a device location of the user, based on settings in the user profile, or based on some other method. For example, when a user logs in to the DMS 126 or an associated application, the user's location may be determined based on one or more of the criteria described herein. Based on the determined location using the various criteria, the system can use the location to affect searching and indexing of the data by the user as described herein. In some embodiments, the user may manually update his or her location. For example, the user may input his or her location as an input to their user profile when initially created and the data may be stored, for example, in a user location column of a database such as the column 506 of FIG. 5. In other embodiments, a user location may be determined automatically. In embodiments, the user location and/or location associated with documents may be assigned to the organization such that all documents or data generated by that organization have the given location associated with them. In some embodiments, the user's location may be associated with a primary language (e.g., as the user location primary language column 508). For example, a primary language associated with users in the United States of America may be English and a primary language associated with users in Brazil may be Portuguese. These are merely exemplary and the primary language could be set based on other properties or actions.

At step 806, the imported document may be analyzed with a natural language processing (NLP) service to determine a primary document language. the natural language API 134 of FIG. 3 may be used to analyze the document to determine a primary document or data language. In some embodiments, the document may be uploaded by the user to the DMS 126 and the DMS 126 may provide the document or data to the natural language API 134 based on, for example, a user input or other logic stored in the DMS 126. In some embodiments, one or more of the DMS 126 and the natural language API 134 may be hosted as a cloud-based SaaS platform (e.g., in a virtual private cloud) and users may upload documents to the cloud-based SaaS platform after logging in to the platform using their user ID and login credentials. The DMS 126 may provide the document or data to a search service, which search service may also be hosted as a cloud-based SaaS platform.

At step 808, a determined document language may be indexed to the imported document based at least in part on: 1) the first organization language and, 2) the primary document language. The system may determine weigh various factors to determine what language to index to the imported document based on the first organization language and the primary document language. For example, in documents having multiple languages, the system may score each of the multiple document languages based on one or more scoring factors to distinguish the primary document language.

At step 810, the imported document may be searched using a document search tool configured to search the imported document in the indexed language. In embodiments, the document may be searched by users from any geographic location and the system may automatically search the document in the documents determined language by translating a natural language inquiry from the user in his or her own language (e.g., Portuguese) into a primary language of the document (e.g., English) as determined hereinabove. Hence, the document may be searched in its primary language. In some embodiments, search results may be returned to the user in his or her own primary language such that they are more useful to the user.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method of optimizing full text search results for multiple languages comprising:
   importing by a processor, a document from a document management server associated with a first organization including one or more first organization users, wherein the one or more first organization users are associated with a first organization location;
   determining by the processor, a first organization language based on the first organization location derived from at least an IP address of a user, a device location of the user, and a user profile;
   storing by the processor, a representation of the first organization language in a database in response to determining the first organization language;

analyzing by the processor, the imported document with a natural language processing (NLP) service to determine a primary document language;

indexing by the processor, a determined document language to the imported document based at least in part on the first organization language and the primary document language, wherein said indexing the determined document language to the imported document comprises:

determining multiple document languages within the document;

in response to determining the multiple document languages, storing the determined multiple document languages in the database, scoring each of the multiple document languages based on one or more scoring factors that include at least a user role within the first organization and a user location to distinguish the primary document language;

in response to scoring the multiple document languages, storing a score for each of the multiple document languages in the database;

automatically assigning the primary document language as distinguished from at least a secondary document language to the document based on the score; and in response to assigning the multiple document languages, storing the assigned primary document language in the database;

receiving a natural language query from a user in a document search tool, wherein the natural language query is in a primary language of the user;

translating by the processor, the natural language query into the determined document language;

executing by the processor, searching of the imported document using the document search tool based on the indexing of the determined document language to the imported document; and displaying by the processor, on a display device, a plurality of search results including the imported document to the user in the primary language of the user.

2. The method of claim 1, wherein the one or more scoring factors include one or more of an IP address, a user keyboard setting, a user keyboard language, a user address, and a user time zone.

3. The method of claim 1, wherein the document is assigned a primary document language that is different than the first organization language if a highest scoring document language is different than the first organization language and the highest scoring document language is above a language threshold score.

4. The method of claim 1, wherein the first organization language is determined based on an organizational association of a user importing the document.

5. The method of claim 1, wherein the determined document language is assigned to the document as a default setting, which default setting is editable to a selected document language by a document owner.

6. The method of claim 1, wherein the determined document language is further based on one or more of a primary user geographic location and a primary user language.

7. The method of claim 1, further comprising:

storing the indexed imported document in a file management system; and searching the indexed and stored document using a search tool configured to search documents using, at least, the primary document language.

8. The method of claim 7, wherein the file management system is the document management server.

9. The method of claim 8, wherein the document management server is hosted in a virtual private cloud.

10. A system for optimizing full text search results for multiple languages comprising:

a processing device, and a memory storing one or more processor-executable instructions, that when executed by the processing device cause the system to:

import a document from a document management server associated with a first organization including one or more first organization users, wherein the one or more first organization users are associated with a first organization location;

determine a first organization language based on the first organization location derived from at least an IP address of a user, a device location of the user, and a user profile;

storing by the processor, a representation of the first organization language in a database in response to determining the first organization language;

analyze the imported document with a natural language processing (NLP) service to determine a primary document language;

index a determined document language to the imported document based at least in part on the first organization language and the primary document language, wherein said index the determined document language to the imported document causes the system to:

determine multiple document languages within the document;

in response to determining the multiple document languages, storing the determined multiple document languages in the database, score each of the multiple document languages based on one or more scoring factors that include at least a user role within the first organization and a user location to distinguish the primary document language;

in response to scoring the multiple document languages, storing a score for each of the multiple document languages in the database;

automatically assign the primary document language as distinguished from at least a secondary document language to the document based on the score; and in response to assigning the multiple document languages, storing the assigned primary document language in the database;

receive a natural language query from a user in a document search tool, wherein the natural language query is in a primary language of the user;

translate the natural language query into the determined document language;

execute searching of the imported document using the document search tool based on the indexing of the determined document language to the imported document; and display, on a display device, a plurality of search results including the imported document to the user in the primary language of the user.

11. The system of claim 10, wherein the document is assigned a primary document language that is different than the first organization language if a highest scoring document language is different than the first organization language and the highest scoring document language is above a language threshold score.

12. The system of claim 10, wherein the first organization language is determined based on an organizational association of a user importing the document.

13. The system of claim 10, wherein the determined document language is assigned to the document as a default setting, which default setting is editable to a selected document language by a document owner.

14. The system of claim 10, further comprising:
storing the indexed imported document in a file management system; and
searching the indexed and stored document using a search tool configured to search documents using, at least, the primary document language.

15. The system of claim 14, wherein the file management system is the document management server.

16. A method of searching a document in an indexed primary document language including:
importing by a processor, a document from a document management server associated with a first organization including one or more first organization users, wherein the one or more first organization users are associated with a first organization location;
determining by the processor, a first organization language based on the first organization location derived from at least an IP address of a user, a device location of the user, and a user profile;
storing by the processor, a representation of the first organization language in a database in response to determining the first organization language;
analyzing by the processor, the imported document with a natural language processing (NLP) service to determine a primary document language;
indexing by the processor, a determined document language to the imported document based at least in part on the first organization language and the primary document language, wherein said indexing the determined document language to the imported document comprises:
determine multiple document languages within the document;
in response to determining the multiple document languages, storing the determined multiple document languages in the database,
score each of the multiple document languages based on one or more scoring factors that include at least a user role within the first organization and a user location to distinguish the primary document language;
in response to scoring the multiple document languages, storing a score for each of the multiple document languages in the database;
automatically assign the primary document language as distinguished from at least a secondary document language to the document based on the score; and
in response to assigning the multiple document languages, storing the assigned primary document language in the database;
receiving a natural language query from a user in a document search tool, wherein the natural language query is in a primary language of the user;
translating by the processor, the natural language query into the determined document language;
searching by the processor, the imported document using the document search tool configured to search the imported document in the indexed language; and
displaying by the processor, on a display device, a plurality of search results including the imported document to the user in the primary language of the user.

17. The method of claim 16, wherein the first organization language is determined based on an organizational association of the first organization user importing the document.

18. The method of claim 16, wherein the determined document language is further based on one or more of a primary user geographic location and a primary user language.

19. The method of claim 2, wherein the one or more scoring factors are prioritized based at least on the user location and the one or more of the IP address.

* * * * *